April 12, 1938.  B. L. LEWIS  2,114,267
WEIGHING SYSTEM
Filed Sept. 17, 1934  2 Sheets-Sheet 1
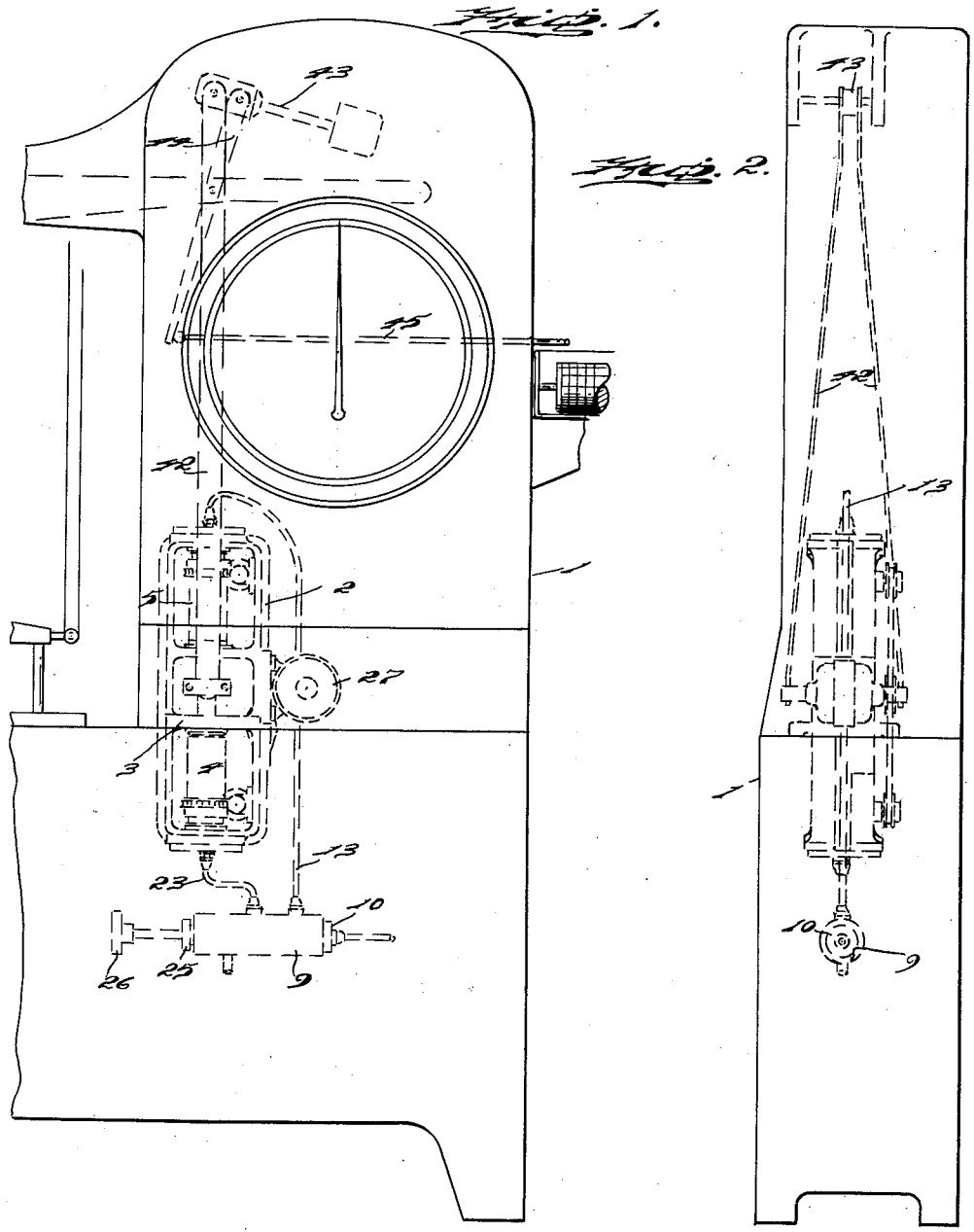
INVENTOR
Bruce L. Lewis
BY
Herbert S. Fairbank
ATTORNEY April 12, 1938.    B. L. LEWIS    2,114,267
WEIGHING SYSTEM
Filed Sept. 17, 1934    2 Sheets-Sheet 2
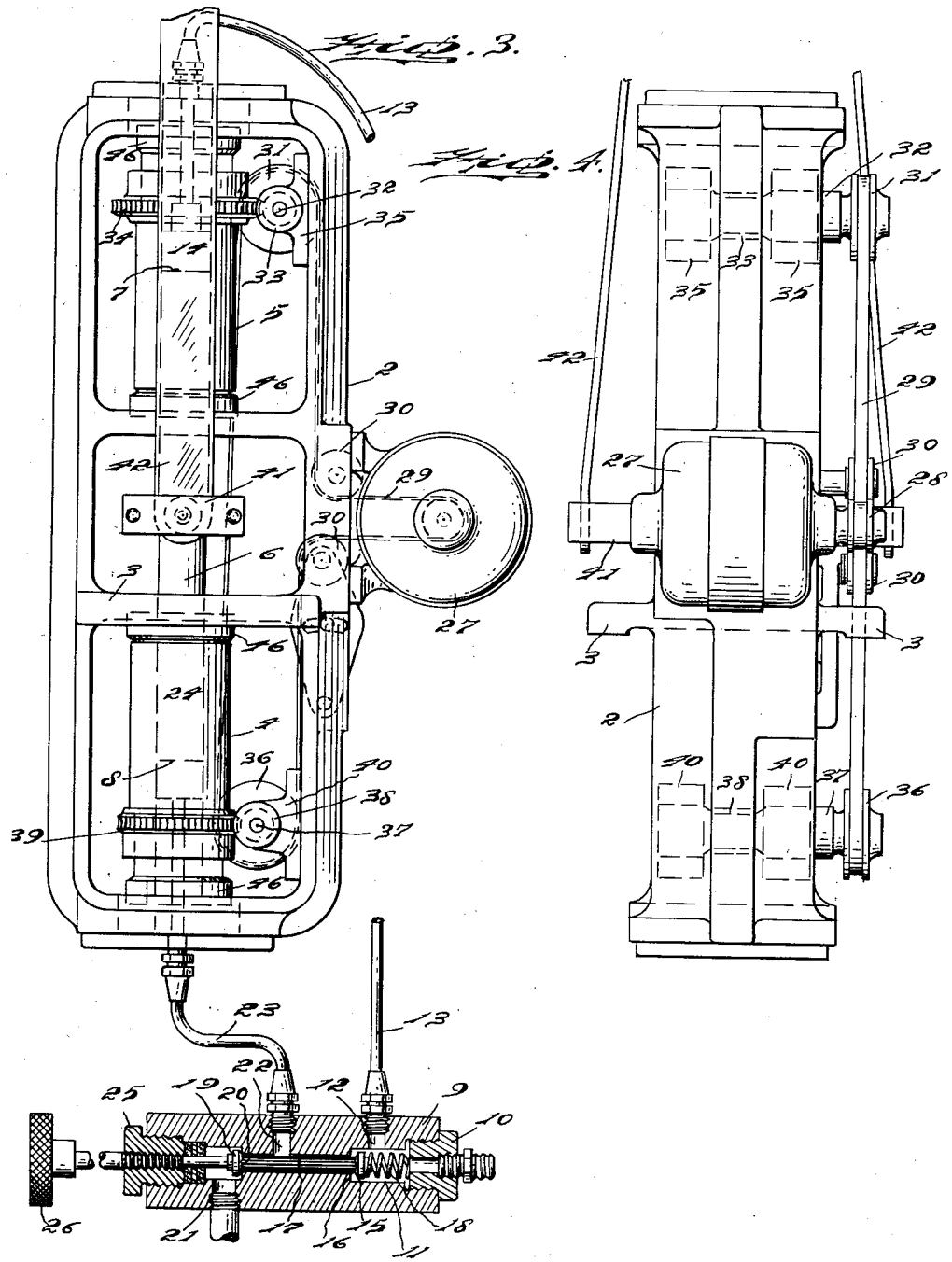
INVENTOR
Bruce L. Lewis
BY
Herbert S. Fairbanks
ATTORNEY Patented Apr. 12, 1938

2,114,267

UNITED STATES PATENT OFFICE 2,114,267

WEIGHING SYSTEM

Bruce L. Lewis, Philadelphia, Pa., assignor to Tinius Olsen Testing Machine Company, Philadelphia, Pa., a corporation of Pennsylvania Application September 17, 1934, Serial No. 744,288

7 Claims. (Cl. 265—14)

The object of this invention is to devise a novel testing machine of the pendulum type with differential weighing cylinders and novel means for revolving the cylinders.

Other novel features of construction and advantage will hereinafter clearly appear in the detailed description and the appended claims.

For the purpose of illustrating the invention, I have shown in the accompanyig drawings a typical embodiment of it, which, in practice, will give reliable and satisfactory results. It is, however, to be understood that this embodiment is typical only and that the various instrumentalities of which my invention consists can be variously arranged and organized, and the invention is not limited to the precise arrangement and organization of these instrumentalities as herein set forth.

Figure 1 is a front elevation of a testing machine, embodying my invention.

Figure 2 is an end elevation of the machine.

Figure 3 is a front elevation on an enlarged scale of weighing cylinders and certain of their adjuncts.

Figure 4 is an end elevation of the construction seen in Figure 3 with the controlling valve omitted.

Similar numerals indicate corresponding parts.

Referring to the drawings:—

1 designates the casing of a testing machine of the pendulum dial type in conjunction with which revoluble weighing cylinders, embodying my invention, are employed. As a testing machine of this general type is described in Bulletin No. 9 of Catalogue 50-A of Tinius Olsen Testing Machine Company of Philadelphia, Pa., I have deemed it unnecessary in this case to illustrate and describe in detail the complete testing machine, as the construction and operation of a machine of this character is now well known by those skilled in this art.

2 designates a frame preferably of skeleton formation having brackets 3 which support it on the frame of the casing 1 and within such casing. The frame 2 has rotatably mounted in it a lower weighing cylinder 4 and an upper weighing cylinder 5 which are chambered to receive a differential piston 6 having at its upper end the head 7 which is of greater pressure area than the lower head 8. 9 is the valve casing of a controlling valve having an apertured plug 10 at one end adapted to be connected to the main cylinder of the hydraulic loading system, and communicating with a chamber 11. A port 12 leads from the chamber 11 and is connected by a conduit 13 with the piston chamber 14 of the upper cylinder 5. A valve 15 cooperates with a valve seat 16 and has a fluted stem slidable in the passage 17. A spring 18 tends to move the valve 15 towards its seat 16. The free end of the valve stem, in the position shown, abuts against the fluted valve stem of a valve 19 which cooperates with a valve seat 20 to control communication between a port 21 leading to a reservoir (not shown). The valve casing has a port 22 communicating with the passage 17 and with a conduit 23 leading to the piston chamber 24 of the lower weighing cylinder 4. The valve 19 has a stem in threaded engagement with a plug 25 and the stem is provided with a grasping handle 26 located at a place accessible to the operator of the testing machine.

The frame 2 has mounted on it an electric motor 27 controllable by the operator in any conventional manner. The shaft of the motor 27 has a pulley 28 around which passes a belt 29, which passes around guide pulleys 30. The belt 29 passes around a pulley 31 on a shaft 32, journalled on the frame 2 and having a gear 33 meshing with a gear 34 on the upper cylinder 5, to effect its revolution. The shaft 32 is journalled in bearings 35.

The belt 29 also passes around a pulley 36 on a shaft 37 journalled on the frame 2. This shaft 37 has a gear 38 meshing with a gear 39 on the lower weighing cylinder 4 to effect its revolution. The shaft 37 is journalled in bearings 40.

The differential piston 6 has trunnion heads 41 to which are pivoted the lower ends of the bars 42. These, at their upper ends, are supported on a conventional pendulum system 43 having an arm 44 which operates the scale rack 45 which controls the motion of the weighing pointer proportional to the load. The cylinders are rotatably mounted between heads 46 carried by the frame 2.

The fluid passes from the main loading cylinder through the conduits 13 and 23 to the weighing cylinders 5 and 4, respectively, and, when the valve 19 is unseated, the fluid passes to the reservoir relieving all pressure in lower weighing cylinder 4, then all pressure acts on piston 7 in weighing cylinders 5, and is weighed in the pendulum weighing system.

During the loading, the motor 27 is operating to revolve the cylinders at a predetermined relative peripheral speed, thereby relieving friction between the differential pistons and their cylinder walls, thus causing all pressure in the loading system to be accurately weighed. In this way, an accurate indication of the force exerted on the specimen under test is secured, thus a true figure of its physical strength is obtained. When piston chamber 24 opens to atmospheric pressure by opening valve 19, the entire reaction of piston 7 is indicated on the scale of the machine. When the valve 19 is closed, piston 8 carries the same internal pressure as piston 7 and the differential only is indicated, thus giving a second scale by which loading efforts can be computed, thus increasing the sensitivity of the weighing by supplying two ranges of operation for the same weighing system.

Prior weighing systems of this type have been equipped with but one weighing cylinder but by my novel arrangement of the opposed cylinders, two ranges are supplied in one machine with the same pendulum weight increasing its effectiveness without sacrificing accuracy.

One feature of revolving the cylinders in opposite directions is to have them revolve at different speeds to produce a zero twisting moment on the weighing system. The pistons are of different diameters, and, therefore, the frictional twisting moments will be different. To overcome this when using different size pistons, the cylinders are revolved at different speeds by changing the ratio of the gearing. The rotation of the cylinders reduces the friction, and the rotation of them in opposite directions relieves the torque tending to twist the trunnions 41.

The cylinders are rotated at different speeds because they are of different diameters to give the same circumferential velocity in both cases which if multiplied by the friction will give equal torque and equalize the tendency to rotate the trunnions 41.

The prevailing force acts downwardly as the larger piston is at the top.

By using piston heads of different sizes, one can take advantage of different reactions and thereby increase the range of operation. This increases the flexibility of the equipment to weigh gravity reactions.

It will now be apparent that I have devised a new and useful weighing system, which embodies the features of advantage enumerated as desirable in the statement of the invention and the above description, and while I have, in the present instance, shown and described a preferred embodiment thereof, which will give in practice satisfactory and reliable results, it is to be understood that this embodiment is susceptible of modification in various particulars without departing from the spirit or scope of the invention or sacrificing any of its advantages.

Having thus described my invention, what I claim as new and desire to secure by Letters Patent is:—

1. In a testing machine having a weighing system, weighing cylinders rotatably mounted and of different diameters, a differential piston for said cylinders, operatively connected with the weighing system of the machine, and means to revolve said cylinders in opposite directions at predetermined different speeds to give the same circumferential velocity which if multiplied by the friction will give equal torque.

2. In a testing machine having a weighing system, weighing cylinders, a common piston in said cylinders having its head for one cylinder having a greater pressure area than the head in the other cylinder, means to connect said piston with the weighing system of the machine, means to introduce a loading fluid into said cylinders, and means to revolve the cylinders in opposite directions at different peripheral speeds during the weighing operation to reduce the friction between the pistons and their cylinder walls.

3. In a testing machine having a weighing system, weighing cylinders, a common piston for said cylinders having its head for one cylinder having a greater pressure area than the head for the other cylinder, trunnions connected with said piston, means to connect said trunnions with the weighing system of the machine, means to introduce a loading fluid into said cylinders, and means to revolve the cylinders in opposite directions during the weighing operation to relieve the friction and prevent the formation of torque tending to twist the trunnions.

4. In a testing machine, a frame, weighing cylinders rotatably mounted therein, and each having a piston chamber, the piston chamber in one cylinder being of greater area than the piston chamber in the other cylinder, a double piston for said chambers, a weighing indicator operatively connected with said pistons to be actuated thereby, said pistons having their heads of different sizes to take advantage of different reactions, means to control the introduction of loading fluid into said piston chambers, and means to revolve said cylinders in opposite directions to reduce friction between the pistons and their cylinder walls, one cylinder being revolved at a constant speed which is different from the constant speed of revolution of the other cylinders.

5. In a testing machine, opposed weighing cylinders, of different diameters interconnected differential pistons therefor, a weighing indicator actuated by said pistons and means to revolve said cylinders in opposite directions at the same peripheral speed to produce zero twisting moment on the weighing system and to relieve the friction and prevent the formation of torque.

6. In a weighing system, opposed weighing cylinders to effect the weighing operation, interconnected pistons therefor, means to load said cylinders, a weighing indicator movable in proportion to load and operatively connected with said pistons to be actuated thereby, and means to revolve said cylinders at a predetermined constant relative peripheral speed in opposite directions to relieve friction between the pistons and their cylinder walls.

7. In a weighing system, opposed weighing cylinders, interconnected pistons therefor, means to load said cylinders, a weighing indicator movable in proportion to load and operatively connected with said pistons to be actuated thereby, and means to revolve said cylinders in opposite directions to relieve the friction and prevent the formation of the torque.

BRUCE L. LEWIS.